(12) United States Patent
Connolly et al.

(10) Patent No.: US 6,491,024 B1
(45) Date of Patent: Dec. 10, 2002

(54) SYSTEM AND METHOD FOR COLD START CONTROL OF INTERNAL COMBUSTION ENGINES

(75) Inventors: Francis Connolly, Ann Arbor, MI (US); Kelvin Lee Dobbins, Dearborn, MI (US); Kenneth Carl Leisenring, Dearborn, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 58 days.

(21) Appl. No.: 09/686,036

(22) Filed: Oct. 11, 2000

(51) Int. Cl.[7] .................................................. F02P 5/00
(52) U.S. Cl. .............................. 123/406.19; 123/406.28
(58) Field of Search ..................... 123/406.19, 406.28, 123/406.29, 406.41, 406.42, 406.43, 406.45, 406.59, 435

(56) References Cited

U.S. PATENT DOCUMENTS

| | | | |
|---|---|---|---|
| 4,622,939 A | 11/1986 | Matekunas | |
| 4,703,732 A | 11/1987 | Wineland | |
| 4,867,123 A | 9/1989 | Javanherian | |
| 5,038,744 A | 8/1991 | Martin | |
| 5,050,556 A | 9/1991 | Williams | |
| 5,156,126 A | 10/1992 | Ohkubo | |
| 5,253,627 A | 10/1993 | Miyata | |
| 5,540,202 A | 7/1996 | Cullen | |
| 5,623,412 A | 4/1997 | Masson | |
| 5,626,117 A | 5/1997 | Wright | |
| 5,778,857 A | 7/1998 | Nakamura | |
| 5,909,723 A | * 6/1999 | Ichimoto et al. | 123/406.19 |
| 6,053,140 A | * 4/2000 | Feichtinger et al. | 123/143 B |
| 6,293,246 B1 | * 9/2001 | Tanahashi et al. | 123/305 |
| 6,318,891 B1 | * 11/2001 | Haffner et al. | 123/406.28 |

* cited by examiner

Primary Examiner—John Kwon (57) ABSTRACT

Systems and methods for controlling an internal combustion engine during and shortly after starting include controlling combustion burn location via ignition timing to improve engine stability while reducing feedgas emissions. Open or closed loop control based on observed or measured mass fraction burned or cumulative released heat allows maintenance of a lean air/fuel ratio charge with significantly retarded ignition timing to reduce catalyst light-off time and temperature and reduce engine feedgas emissions.

15 Claims, 6 Drawing Sheets

SYSTEM AND METHOD FOR COLD START CONTROL OF INTERNAL COMBUSTION ENGINES

TECHNICAL FIELD

The present invention relates to systems and methods for controlling an internal combustion engine during and shortly after starting.

BACKGROUND ART

Optimal control of internal combustion engines during starting presents a number of challenges. Conventional strategies provide a rich (excess fuel) air/fuel ratio charge during cranking and run-up with advanced ignition timing to achieve stable combustion. Spark feedback control of engine speed is then used during idling to compensate for disturbances such as operation of vehicle accessories.

To reduce feedgas emissions during cranking and startup, and to reduce the time required for any catalyst to become operational, ignition timing may be retarded along with air/fuel enleanment during the first twenty or more seconds after starting. These cold start operating conditions present significant difficulty in that they can approach and exceed engine operational stability boundaries and are increasingly susceptible to disturbances and wear/aging factors. Current control strategies require compromises during these operating conditions from optimal ignition timing and air/fuel calibration to avoid rough operation, speed oscillations, and/or stalling. Engine calibration compromises must also accommodate manufacturing variation, changing environmental conditions (especially humidity), and component aging and wear.

SUMMARY OF THE INVENTION

An object of the present invention is to provide a system and method for controlling an internal combustion engine during and shortly after starting to provide improved engine stability and reduced emissions by controlling combustion burn location via ignition timing.

In carrying out the above object and other objects, advantages, and features of the present invention, a system and method for controlling an internal combustion engine include providing a cylinder charge with an air/fuel ratio slightly lean of stoichiometry and controlling combustion burn location retarded from that of MBT using ignition timing to compensate for engine operational difficulties during starting.

The present invention provides a number of advantages. For example, the present invention minimizes calibration tradeoffs previously required to maintain stable combustion during and shortly after starting to reduce feedgas emissions, increase exhaust gas heat flow, and reduce catalyst light-off time. Engine cold start control based on combustion burn location allows for more aggressive spark retard and allows the air/fuel ratio to be maintained slightly lean of stoichiometry while maintaining engine stability and reducing roughness, speed oscillations, and stalls.

The above advantages and other advantages, objects, and features of the present invention, will be readily apparent from the following detailed description of the best mode for carrying out the invention when taken in connection with the accompanying drawings.

BEST MODE FOR CARRYING OUT THE INVENTION

As will be appreciated by those of ordinary skill in the art, the present invention is independent of the particular engine technology and may be used in a variety of types of internal combustion engines to improve control during and shortly after starting. For example, the present invention may be used in conventional engines in addition to direct injection stratified charge (DISC) or direct injection spark ignition (DISI) engines which may use VCT or variable valve timing mechanisms, for example.

Figure 1:
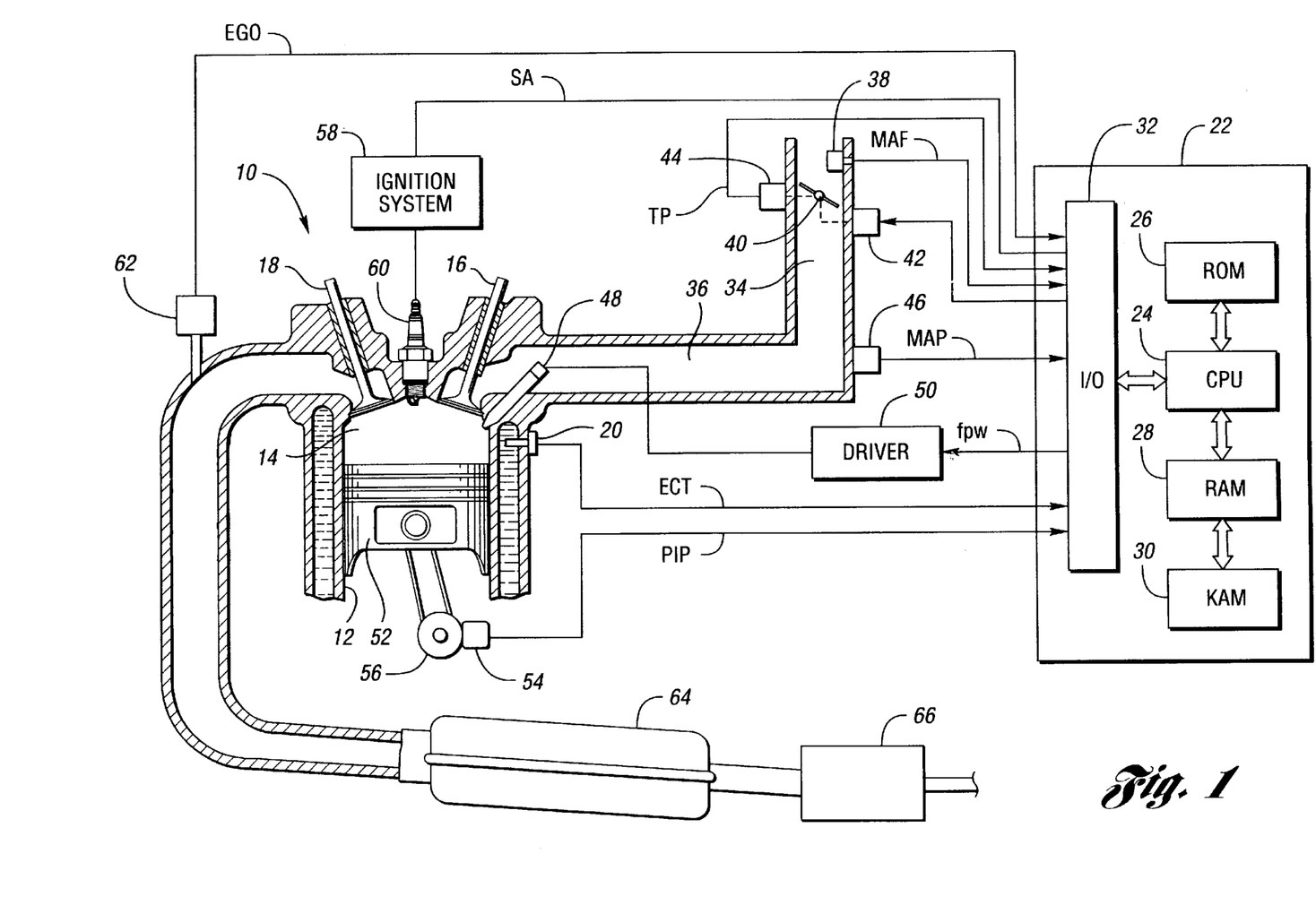
FIG. 1 is a block diagram illustrating operation of one embodiment of a system or method for controlling an internal combustion engine to provide reduced emissions during starting according to the present invention.

A block diagram illustrating an engine control system for a representative internal combustion engine according to the present invention is shown in FIG. 1. System 10 preferably includes an internal combustion engine having a plurality of cylinders, represented by cylinder 12, having corresponding combustion chambers 14. As one of ordinary skill in the art will appreciate, system 10 includes various sensors and actuators to effect control of the engine. One or more sensors or actuators may be provided for each cylinder 12, or a single sensor or actuator may be provided for the engine. For example, each cylinder 12 may include four actuators, which operate the intake valves 16 and exhaust valves 18 while only including a single engine coolant temperature sensor 20.

System 10 preferably includes a controller 22 having a microprocessor 24 in communication with various computer-readable storage media. The computer readable storage media preferably include a read-only memory (ROM) 26, a random-access memory (RAM) 28, and a keep-alive memory (KAM) 30. As known by those of ordinary skill in the art, KAM 30 is used to store various operating variables while controller 22 is powered down but is connected to the vehicle battery (not shown). The computer-readable storage media may be implemented using any of a number of known memory devices such as PROMs, EPROMs, EEPROMs, flash memory, or any other electric, magnetic, optical, or combination memory device capable of storing data, some of which represents executable instructions, used by microprocessor 24 in controlling the engine. The computer-readable storage media may also include floppy disks, CD-ROMs, hard disks, and the like. Microprocessor 24 communicates with the various sensors and actuators via an input/output (I/O) interface 32. Of course, the present invention could utilize more than one physical controller, such as controller 22, to provide engine/ vehicle control depending upon the particular application.

In operation, air passes through intake 34, where it may be distributed to the plurality of cylinders via an intake manifold, indicated generally by reference numeral 36. System 10 preferably includes a mass airflow sensor 38, which provides a corresponding signal (MAF) to controller 22 indicative of the mass airflow. If no mass airflow sensor is present, a mass airflow value may be inferred from various engine operating parameters. A throttle valve 40 may be used to modulate the airflow through intake 34 during certain operating modes. Throttle valve 40 is preferably electronically controlled by an appropriate actuator 42 based on a corresponding throttle position signal generated by controller 22. A throttle position sensor 44 provides a feedback signal (TP) indicative of the actual position of throttle valve 40 to controller 22 to implement closed loop control of throttle valve 40.

As illustrated in FIG. 1, a manifold absolute pressure sensor 46 may be used to provide a signal (MAP) indicative of the manifold pressure to controller 22. Air passing through intake manifold 36 enters combustion chamber 14 through appropriate control of one or more intake valves 16. Intake valves 16 and exhaust valves 18 may be controlled directly or indirectly by controller 22 for variable valve timing or variable cam timing applications, respectively. Alternatively, intake valves 16 and exhaust valves 18 may be controlled using a conventional camshaft arrangement. A fuel injector 48 injects an appropriate quantity of fuel in one or more injection events for the current operating mode based on a signal (FPW) generated by controller 22 processed by driver 50. Control of the fuel injection events is generally based on the position of piston 52 within cylinder 12. Position information is acquired by an appropriate sensor 54 which provides a position signal (PIP) indicative of rotational position of crankshaft 56. At the appropriate time during the combustion cycle, controller 22 generates a spark signal (SA) which is processed by ignition system 58 to control spark plug 60 and initiate combustion within chamber 14.

Controller 22 (or a conventional camshaft arrangement) controls one or more exhaust valves 18 to exhaust the combusted air/fuel mixture through an exhaust manifold. An exhaust gas oxygen sensor 62 provides a signal (EGO) indicative of the oxygen content of the exhaust gases to controller 22. This signal may be used to adjust the air/fuel ratio, or control the operating mode of one or more cylinders. The exhaust gas is passed through the exhaust manifold and through first and second emissions control devices 64 and 66, which may include a catalytic converter, for example, before being exhausted to atmosphere.

According to the present invention, controller 22 determines or calculates a value indicative of combustion burn location based on various signals provided by one or more engine sensors. The combustion burn location is preferably indicated by the crank angle position corresponding to 50% mass fraction burned. Mass fraction burned may be calculated by any of a number of known techniques, such as the well known Rassweiler-Withrow method. The combustion burn location is then controlled using various actuators, such as ignition system 58. The present invention provides a more robust control strategy for engine starting and warmup, which compensates for various disturbances. These include uncontrolled air/fuel ratio variations due to production tolerances, fuel characteristics, and environmental conditions (especially humidity) to reduce otherwise necessary calibration compromises to achieve stable engine operation.

Figure 2:
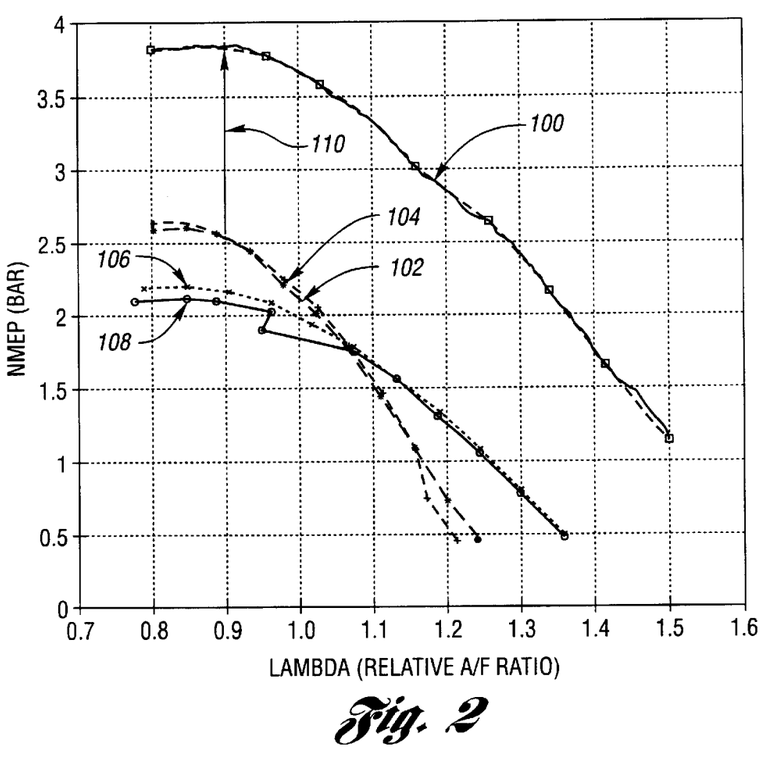
FIG. 2 is a graph illustrating the increased sensitivity of engine torque to air/fuel ratio and spark timing for lean operation with retarded spark timing according to one embodiment of a system or method of the present invention.

FIG. 2 is a graph illustrating the increased sensitivity of engine torque to air/fuel ratio and spark timing for lean operation with spark timing retarded from MBT according to one embodiment of a system or method of the present invention. It is well known that engine torque is relatively insensitive to air/fuel ratio changes rich of stoichiometry and equally insensitive to spark or ignition timing changes at MBT spark timing. FIG. 2 illustrates the increased disturbance sensitivity caused by operating at a lean air/fuel ratio which causes a much greater sensitivity of engine torque to uncontrolled changes in air/fuel ratio. Line 100 represents the net mean effective pressure (NMEP) as a function of relative air to fuel ratio ($\lambda$) with ignition timing at 10° before top dead center (BTDC) at 0.52 bar manifold absolute pressure (MAP). The NMEP tracks engine brake torque. Lines 106 and 108 represent NMEP or engine torque as a function of $\lambda$ for ignition timing of 10° BTDC at 0.37 bar MAP. Lines 102 and 104 represent the change in NMEP with $\lambda$ for retarded ignition timing of 10° after top dead center (ATDC) for 0.52 bar MAP. The increase in MAP from 0.37 bar for lines 106 and 108 to 0.52 bar for lines 102 and 104 results from the fact that the throttle must be opened as spark is retarded to maintain the same engine brake torque. Note from lines 102/104 near $\lambda=1.05$ (and spark =10° ATDC, i.e., the cold start operating conditions of this invention) the increased sensitivity to torque, or NMEP, to $\lambda$ (i.e., the slope of lines 102/104) over that of lines 106/108 (i.e., $\lambda=1.05$ with spark =10° BTDC).

The representative values illustrated in the graph of FIG. 2 are for steady state, warmed-up operation. For a cold, i.e., ambient temperature, engine, the increased sensitivity of engine torque to air/fuel ratio appears qualitatively to be much greater but is difficult to quantify due to the transient nature of cold start. One reason is that during starting of the engine, typical air/fuel ratio charge quality problems due to cold engine temperatures and the severe start transient (homogeneity, vapor percentage, etc.) have a significant negative impact on engine operation (unlike warmed-up operation) especially during operation according to the present invention which preferably operates at higher than normal loads (airflow and fuel flow). This is why conventional cold starts use rich air/fuel ratios ($\lambda$) during start and warmup. Unlike these conventional engine starts with rich air/fuel ratio and spark timing closer to MBT, engine starts according to the present invention maintain a lean or near stoichiometric air/fuel ratio with retarded spark timing boundaries to reduce emissions. As mentioned earlier, those conditions can be close to or at engine stability boundaries for optimal emission performance. Conditional start control strategies do not compensate for the increased torque sensitivity to air/fuel, and may thus result in unstable operation.

According to the present invention, however, combustion burn location parameters are used to effectively control or compensate the ignition timing to reduce or eliminate significant torque fluctuations which may lead to speed oscillations, roughness, and/or stalling. Line 110 of FIG. 2 (i.e., the NMEP difference between lines 102/104 and line 100) illustrates the increase in engine torque when changing spark timing from 10° ATDC to 10° BTDC while maintaining air/fuel ratio and throttle fixed at the conditions of retarded spark timing operation (i.e., conditions of line 104 and 102). This illustrates the powerful level of control authority spark timing has during the cold start conditions of this invention.

Figure 3:
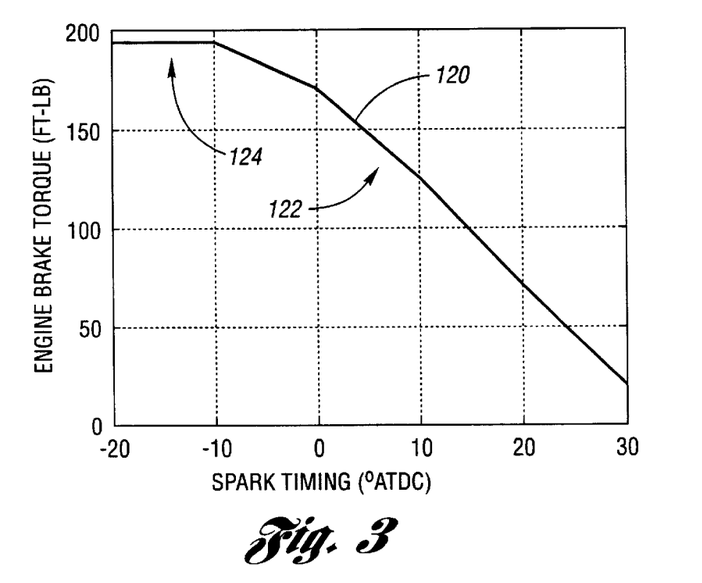
FIG. 3 is a graph illustrating the effect of ignition timing on engine brake torque for a constant throttle position.

FIG. 3 is a graph illustrating the effect of ignition timing on engine brake torque for a constant throttle position and air/fuel ratio. The graph of FIG. 3 demonstrates that spark timing is a very powerful control actuator for engine torque when spark is retarded from MBT, such as in region 122, relative to the insensitivity of torque to spark around MBT, such as illustrated in area 124. Changing spark in region 122 is equivalent to traveling line 110 in FIG. 2. In addition, spark timing control is a relatively fast actuator in that changes to spark timing can affect the torque produced by the next combustion.

Figures 4, 5:
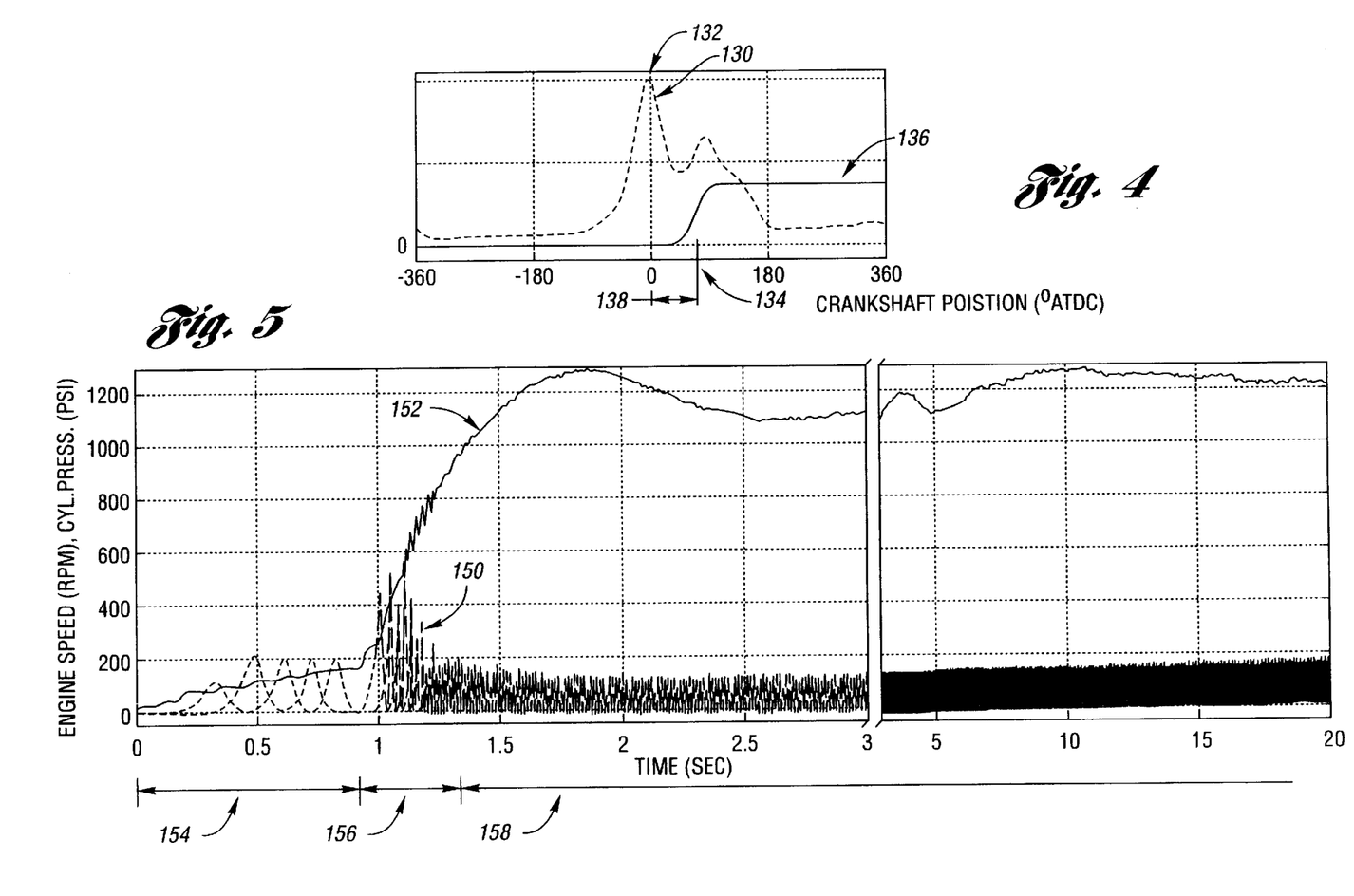
FIG. 4 is a graph of cylinder pressure as a function of crankshaft position illustrating combustion burn location based on 50% mass fraction burned according to one embodiment of the present invention.
FIG. 5 is a graph illustrating engine speed and combustion pressure waveforms for a typical engine start using combustion burn location control according to one embodiment of the present invention.

FIG. 4 is a graph of cylinder pressure as a function of crankshaft rotational position illustrating combustion burn location based on 50% mass fraction burned (or, 50% cumulative heat released) according to one embodiment of the present invention. Line 130 represents the cylinder pressure for a single cylinder during one engine cycle with spark timing retarded to 10° ATDC. The cylinder pressure peaks at point 132 corresponding to top dead center (TDC) due to the compression and expansion of the unignited cylinder charge by the moving piston. Point 134 represents the combustion burn location relative to crankshaft position based on a combustion burn location parameter, such as 50% mass fraction burned. Line 136 represents the cumulative released heat waveform as determined by the Rassweiler-Withrow method, for example. In this example, point 134 represents the location of 50% heat release (or the 50% mass fraction burned location) as determined from the cumulative released heat waveform. Other similar calculations can provide a suitable measure of a combustion parameter. Lines 138 represent the burn duration which is, in general, correlated to engine output torque for the cold start conditions of this invention, with torque decreasing as burn duration increases. As such, combustion burn location can be a very good, direct measure of combustion quality. Observation of combustion burn location according to the present invention provides a means to adjust the nominal burn location to a desired value and to quickly compensate for otherwise uncontrolled detrimental disturbances in the combustion system by using feedback control to modify ignition timing to avoid sudden changes in engine output torque, unstable engine operation, and/or stall. Alternatively, open loop compensation for spark timing may be designed based on the observed cold start phenomena to achieve the same effect. For example, open loop control may schedule ignition timing compensation based on engine speed, load, MAP, or any other parameter during the cold start based on empirical data rather than being based on a feedback parameter.

FIG. 5 is a graph illustrating engine speed and combustion pressure waveforms for a typical engine start using combustion burn location control according to one embodiment of the present invention. Lines generally represented by reference numeral 150 correspond to the cylinder pressure signals for an eight-cylinder internal combustion engine. Line 152 represents the engine speed signal. During a typical cold start from ambient temperature, various control strategies may be used during engine cranking, represented by period 154, engine speed run-up, represented by period 156, and idle/warmup represented by period 158. According to the present invention, combustion burn location feedback control becomes active during cranking period 154 or run-up period 156. Depending upon the particular operating conditions, the combustion burn location feedback control preferably stays active until some point in warmup period 158 when it is no longer necessary for improving engine stability.

Figure 6:
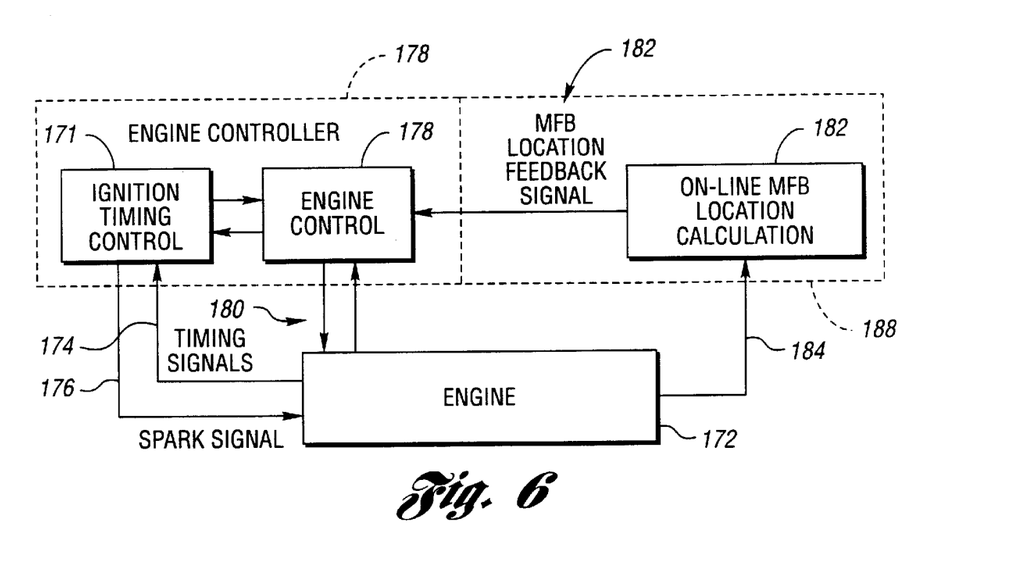
FIG. 6 is a block diagram illustrating a system or method for controlling an engine during and shortly after starting using feedback of mass fraction burned according to one embodiment of the present invention.
Figure 7:
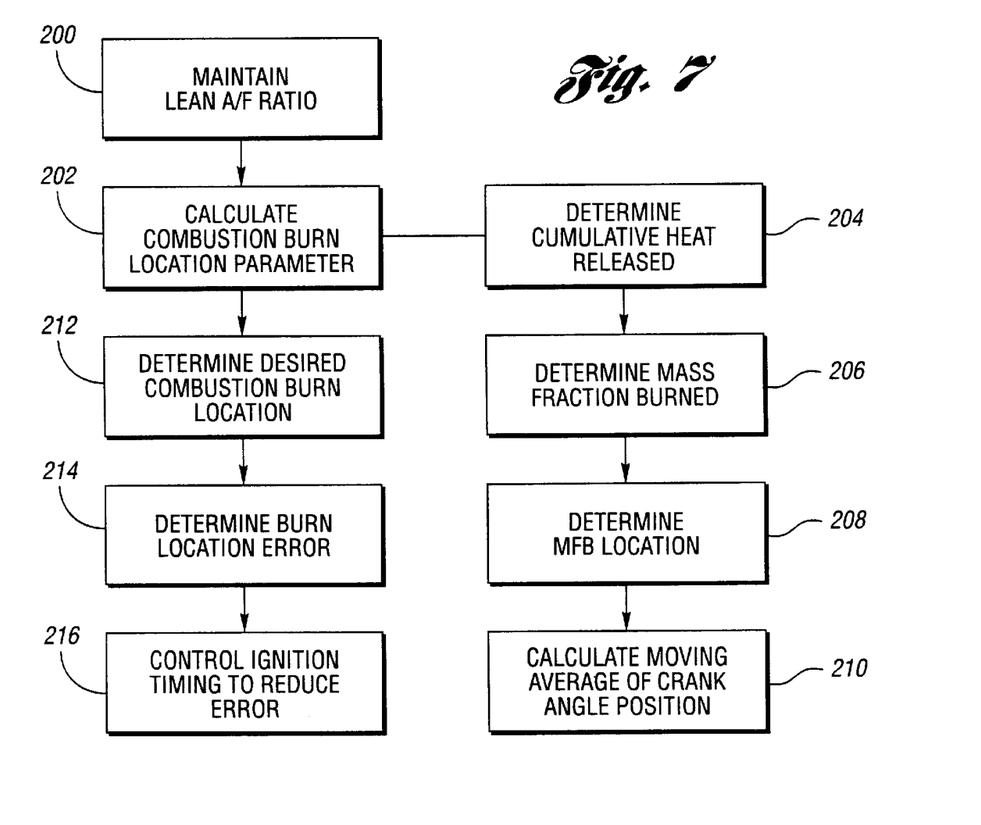
FIG. 7 is a flowchart illustrating operation of one embodiment for a system or method for controlling an internal combustion engine according to the present invention.

Diagrams illustrating operation of systems and methods for controlling an internal combustion engine during and shortly after startup are shown in FIGS. 6 and 7. The diagrams generally represent control logic of one embodiment of a system or method according to the present invention. As will be appreciated by one of ordinary skill in the art, the diagrams may represent any one or more of a number of known processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages of the invention, but is provided for ease of illustration and description. Although not explicitly illustrated, one of ordinary skill in the art will recognize that one or more of the illustrated steps or functions may be repeatedly performed depending upon the particular processing strategy being used.

Preferably, the control logic is implemented primarily in software executed by a microprocessor-based engine controller. Of course, the control logic may be implemented in software, hardware, or a combination of software and hardware depending upon the particular application. In one preferred embodiment, various engine sensors and actuators are used in conjunction with the illustrated control logic to perform the illustrated steps or functions. When implemented in software, the control logic is preferably provided in a computer-readable storage medium having stored data representing instructions executed by a computer to control the engine. The computer-readable storage medium or media may be any of a number of known physical devices which utilize electric, magnetic, and/or optical devices to temporarily or persistently store executable instructions and associated calibration information, operating variables, and the like.

FIG. 6 is a block diagram illustrating a system or method for controlling an engine during and shortly after starting using feedback of mass fraction burned location according to one embodiment of the present invention. Engine controller 170 communicates with engine 172 to provide combustion burn location control according to the present invention. Engine controller 170 includes control logic to provide ignition timing control 171 based on timing signals 174 to generate a spark signal 176 for engine 172. Additional engine control logic 178 communicates via various other sensors and actuators 180 with engine 172 to coordinate control. Control logic for computing or calculating the combustion burn location 182 receives signals from one or more engine sensors 184 and provides a feedback signal 186 to engine control 178. Control logic 182 may be implemented separately from engine controller 170 or alternatively integrated with the control logic of engine controller 170 as indicated by line 188. According to the present invention, an open loop control/compensation of ignition timing based on suitable measurable engine parameters, such as speed, load, injected air/fuel, etc., using a calculated, estimated, or observed burn location may be performed during some operation modes, such as during cranking. A closed loop spark timing feedback control, such as illustrated in FIG. 6, may also be performed based on a suitable measure of a combustion parameter such as mass fraction burn location to compensate for combustion difficulties during the transient period during and just after engine speed run-up while operating with a lean or near stoichiometric air/fuel ratio and retarded ignition timing.

For open loop control, suitable measurable parameters include those which capture information to allow scheduled compensation to correct for the combustion difficulties as described above. This open loop compensation may be designed by observing phenomena resulting from the cold start conditions of this invention. During closed loop control, suitable parameters are those which reflect combustion conditions while updating quickly enough to allow for compensation of combustion difficulties while at the same time rejecting noise. In one embodiment according to the present invention, closed loop combustion burn location for an eight-cylinder engine calculates a 50% mass fraction burned location for each TDC interval based on a moving arithmetic average of the estimated 50% mass fraction burned location of the last eight combustions (aggregate across all cylinders). This calculation provides sufficient bandwidth to update the engine combustion condition estimate with sufficient filtering to adequately diminish the effects of combustion variation. Such a measurable variable allows design of an appropriate feedback controller, such as a proportional-integral (PI) controller or the like that can quickly compensate for combustion difficulties. In addition, spark timing feedback may be implemented based on feedback from a single cylinder, a group of cylinders, or all cylinders.

FIG. 7 is a flowchart illustrating operation of one embodiment for a system or method for controlling an internal combustion engine according to the present invention. A lean or near stoichiometric air/fuel ratio is maintained as represented by block 200. In one preferred embodiment, the relative air/fuel ratio ($\lambda$) is maintained slightly lean or stoichiometric, i.e., about 1.05. A combustion burn location parameter is calculated or determined as represented by block 202. The combustion burn location parameter may be based on the location corresponding to a percentage of mass fraction burned (MFB) as represented by blocks 204–210. In one preferred embodiment, the MFB location is determined by calculating the cumulative heat released as represented by block 204. This is normalized by dividing by the total heat released to determine the mass fraction burned as indicated by block 206. The crank angle position corresponding to a particular MFB (such as 50% for example) is determined as represented by block 208. A moving average of the crank angle positions is then determined as indicated by block 210. Other statistical calculations may be performed to provide the necessary filtering and bandwidth of the combustion burn location parameter as described above.

For closed-loop operation, a desired combustion burn location is determined or scheduled as represented by block 212. The desired and estimated or actual burn location are used to determine a burn location error as represented by block 214. The error is operated on by an appropriate feedback controller to control the ignition timing to reduce the error as represented by block 216.

FIGS. 8–11 correspond to a cold start from an ambient temperature of about 70° F. with a relative air/fuel ratio of 1.05, 20 ft-lb brake load and 10° ATDC nominal ignition timing. A 50% mass fraction burned location feedback parameter was used to provide closed loop ignition timing control.

Figure 8:
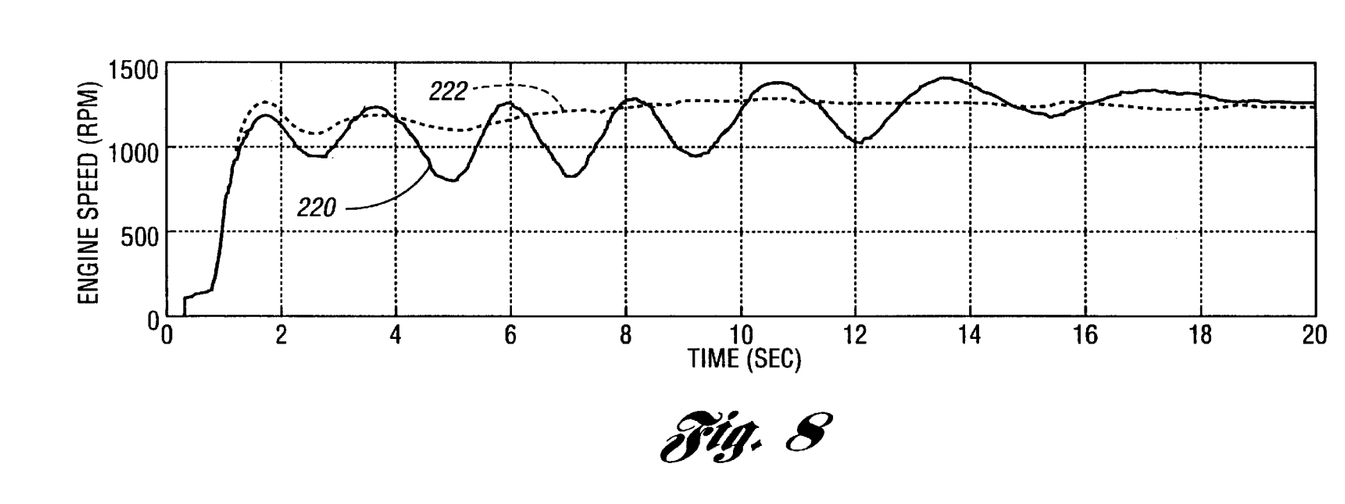
FIG. 8 is a graph illustrating improvement in engine speed control during and shortly after starting according to one embodiment of the present invention.

FIG. 8 is a graph illustrating improvement in engine speed control during and shortly after starting based on combustion burn location control according to one embodiment of the present invention. Line 220 represents the engine speed as a function of time with conventional scheduled ignition timing control. As illustrated in FIG. 8, scheduled ignition timing control with a slightly lean air/fuel ratio and retarded ignition timing results in significant speed oscillations during the first several seconds after starting. Line 222 illustrates the engine speed using combustion burn location feedback for ignition timing control according to the present invention.

Figure 9:
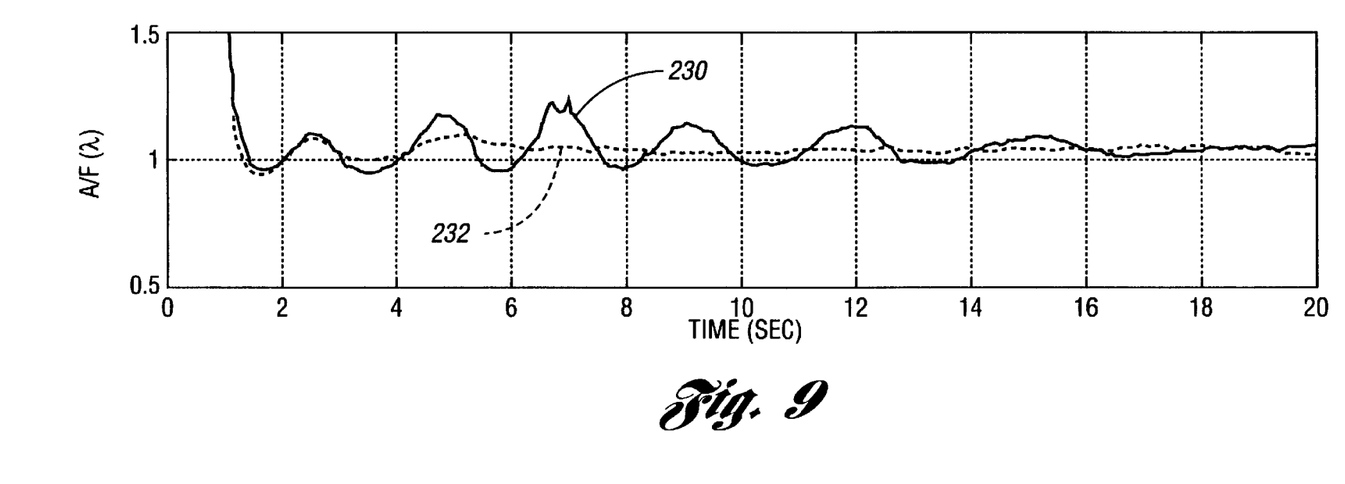
FIG. 9 is a graph illustrating improvement in air/fuel ratio control during and shortly after starting according to one embodiment of the present invention.

FIG. 9 is a graph illustrating improvement of air/fuel ratio control during and shortly after starting. Line 230 represents the relative air/fuel ratio ($\lambda$) using scheduled ignition timing control. Line 232 corresponds to the improved air/fuel ratio control with combustion burn location feedback ignition timing according to the present invention. As illustrated in FIG. 9, air/fuel ratio control experiences fewer oscillations and is more stable with combustion burn location feedback according to the present invention.

Figure 10:
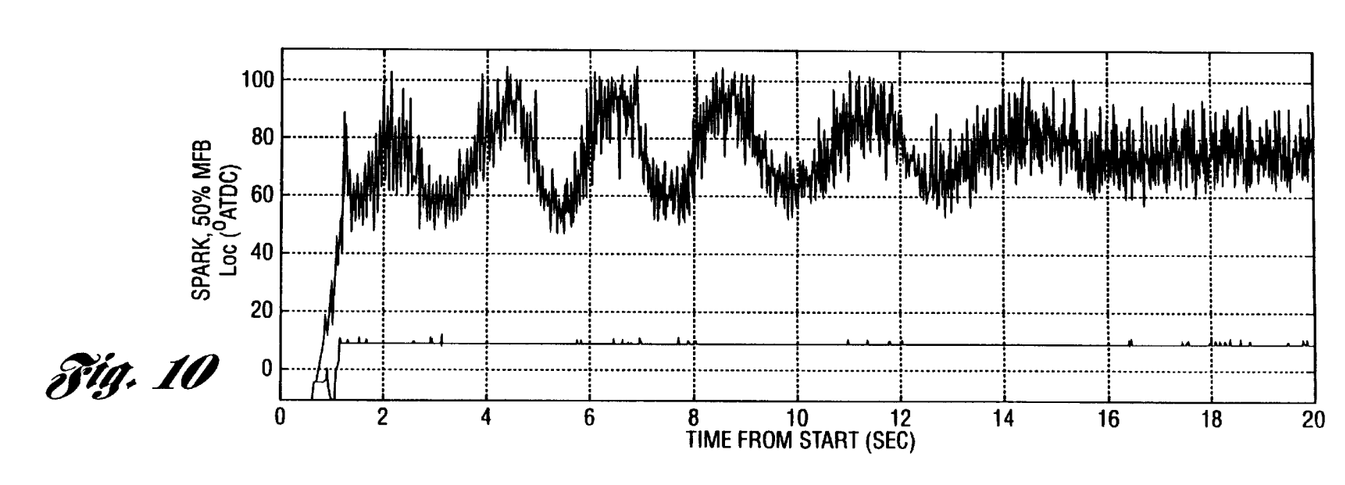
FIG. 10 is a graph illustrating combustion burn location and ignition timing during and shortly after starting without feedback according to the present invention.
Figure 11:
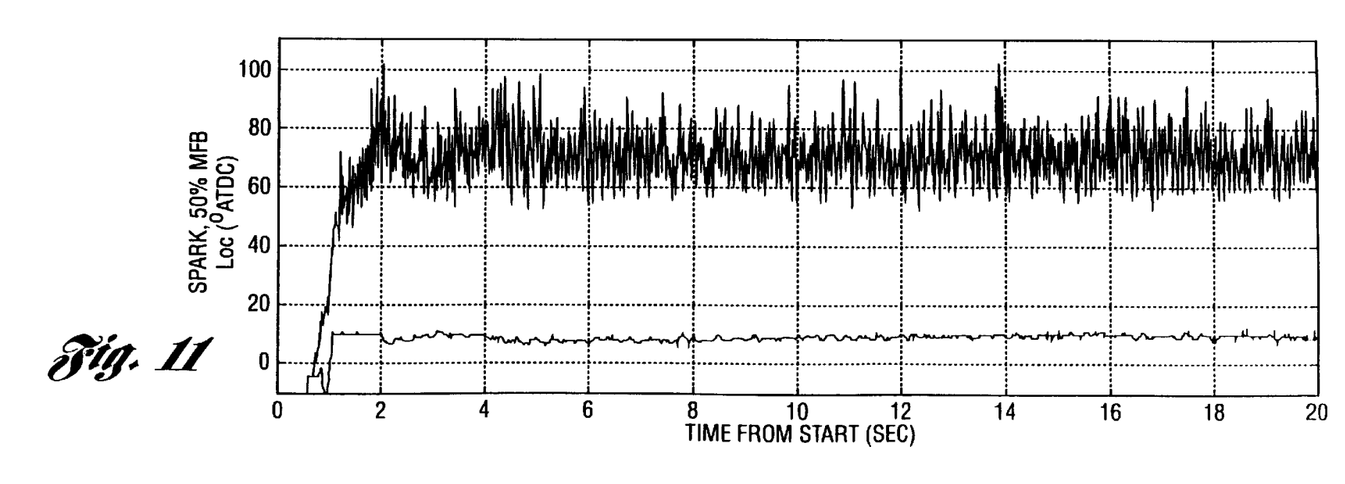
FIG. 11 is a graph illustrating combustion burn location and ignition timing during and shortly after starting with feedback according to one embodiment of the present invention.

FIG. 10 is a graph illustrating combustion burn location and ignition timing during and shortly after starting without control of mass fraction burned location according to the present invention. Line 240 represents the combustion burn timing parameter corresponding to 50% mass fraction burned location without feedback according to the present invention. Line 242 represents the corresponding ignition timing for conventional scheduled ignition timing control. FIG. 11 is a graph illustrating combustion burn location and ignition timing during and shortly after starting using feedback of 50% mass fraction burned location according to the present invention. Line 244 represents the combustion burn timing parameter corresponding to 50% mass fraction burned location. Line 246 represents the ignition timing according to the present invention which varies slightly in response to the combustion burn location based on the feedback control. As shown in the figure, little spark adjustment is needed to stabilize engine operation.

As described above, the present invention provides systems and methods for controlling an internal combustion engine during and shortly after starting which provide stable combustion while affording many advantages in terms of reduced feedgas emissions, lower catalyst light-off temperature, and reduced catalyst light-off times. Control of combustion burn location according to the present invention via ignition timing provides a robust strategy which allows more aggressive spark retard while maintaining lean air/fuel ratios during starting.

While the best mode for carrying out the invention has been described in detail, those familiar with the art to which this invention relates will recognize various alternative designs and embodiments for practicing the invention as defined by the following claims.

What is claimed is:

1. A method for controlling a multi-cylinder internal combustion engine having a plurality of sensors for determining current operating conditions and a plurality of actuators for effecting control of the engine including a fuel actuator and a spark actuator in communication with an engine controller, the method comprising:

providing a cylinder charge having a lean air/fuel ratio;

calculating a combustion burn location parameter based on signals obtained from at least one of the plurality of sensors; and controlling ignition timing based on the combustion burn location parameter.

2. The method of claim 1 wherein the step of controlling ignition timing comprises retarding ignition timing.

3. The method of claim 1 wherein the step of calculating a combustion burn location parameter comprises determining cumulative released heat of combustion.

4. The method of claim 1 wherein the step of calculating a combustion burn location parameter comprises determining mass fraction burned for the charge.

5. The method of 1 wherein the step of calculating a combustion burn location parameter comprises calculating a parameter based on at least one of engine speed, load, and cylinder charge.

6. The method of claim 1 wherein the step of calculating a combustion burn location parameter comprises:

calculating a crank angle position corresponding to 50% mass fraction burned for each cylinder; and calculating a moving average of crank angle positions of 50% mass fraction burned for all of the cylinders.

7. The method of claim 1 wherein the step of providing a cylinder charge comprises controlling at least the fuel actuator to provide an air/fuel equivalence ratio of about 1.05.

8. The method of claim 1 further comprising:

determining a desired value for the combustion burn location parameter based on current engine operating conditions;

determining an estimated actual value for the combustion burn location parameter;

determining an error based on the desired value and the estimated actual value for the combustion burn location parameter; and modifying the ignition timing to reduce the error toward zero.

9. The method of claim 1 wherein the step of calculating a combustion burn location parameter includes monitoring at least one of engine speed, load, fuel, and manifold pressure and wherein the step of controlling ignition timing includes modifying ignition timing based on the at least one monitored parameter so as to operate in open loop control.

10. A system for controlling a multicylinder internal combustion engine, the system comprising:

a plurality of sensors for determining current engine operating conditions;

a plurality of actuators for effecting control of the engine including a fuel actuator and a spark actuator;

an engine control module in communication with the plurality of sensors and the plurality of actuators, the engine control module controlling at least the fuel actuator to provide a cylinder charge having a lean air/fuel ratio during cranking and run-up of engine speed, determining a parameter indicative of combustion burn location based on signals obtained from at least one of the plurality of sensors, and controlling ignition timing based on the parameter to improve engine stability and reduce emissions during engine startup.

11. The system of claim 10 wherein the engine control module controls ignition timing by increasing ignition timing retard during the engine speed run-up.

12. The system of claim 11 wherein ignition timing retard is increased from about ten degrees before top dead center to at least about ten degrees after top dead center within about 100 milliseconds.

13. The system of claim 12 wherein the parameter indicative of combustion burn location includes a crank angle position corresponding to a predetermined percentage of mass fraction burned.

14. The system of claim 10 wherein the engine control module controls ignition timing based on a difference between a desired and estimated actual combustion burn location.

15. The system of claim 14 wherein the estimated actual combustion burn location is determined using a moving average of calculated combustion burn locations for one engine cycle.

* * * * *